United States Patent [19]

Cole, Jr.

[11] 4,400,220

[45] * Aug. 23, 1983

[54] SUPPRESSION OF RESPIRABLE DUST WITH FOAM

[76] Inventor: Howard W. Cole, Jr., 12 Vale Dr., Mountain Lakes, N.J. 07046

[ * ] Notice: The portion of the term of this patent subsequent to Jan. 4, 1994 has been disclaimed.

[21] Appl. No.: 358,843

[22] Filed: Mar. 17, 1982

Related U.S. Application Data

[60] Continuation of Ser. No. 218,201, Dec. 19, 1980, abandoned, which is a continuation of Ser. No. 42,634, May 25, 1979, abandoned, which is a continuation of Ser. No. 849,264, Nov. 7, 1977, abandoned, which is a continuation of Ser. No. 696,733, Jun. 16, 1976, abandoned, which is a division of Ser. No. 527,812, Nov. 27, 1974, Pat. No. 4,000,992.

[51] Int. Cl.³ ............................................. B08B 15/00
[52] U.S. Cl. .................................... 134/18; 134/25.1; 134/32; 134/131; 299/12; 239/8; 239/343; 252/88; 261/DIG. 26
[58] Field of Search ................. 134/25.1, 131, 18, 32; 299/12; 239/343, 8; 169/9, 14, 15, 64; 252/88, 307, 382; 261/DIG. 26; 55/87, 223

[56] References Cited

U.S. PATENT DOCUMENTS

| | | | |
|---|---|---|---|
| 3,533,473 | 10/1970 | Jamison | 169/15 X |
| 3,734,834 | 5/1973 | Bricmont | 201/39 |
| 3,757,491 | 9/1973 | Gourdine | 299/12 X |
| 3,811,247 | 5/1974 | Huppke | 55/233 X |
| 3,954,662 | 5/1976 | Salyer et al. | 252/88 X |
| 3,974,965 | 8/1976 | Miller | 239/432 X |
| 4,000,992 | 1/1977 | Cole | 55/87 |

FOREIGN PATENT DOCUMENTS

| | | | |
|---|---|---|---|
| 1114281 | 12/1981 | Canada. | |
| 435351 | 9/1935 | United Kingdom | 299/12 |
| 602406 | 5/1948 | United Kingdom | 299/12 |

OTHER PUBLICATIONS

Bikerman, Foams (1973), pp. 1-2, 38-39, 312-313.
Wojtowicz et al., "Foam Suppression of Respirable Coal Dust", USBM Contract Final Report HO111351, Department of Interior: Bureau of Mines, Oct. 1974.

Primary Examiner—Richard V. Fisher
Attorney, Agent, or Firm—Hopgood, Calimafde, Kalil, Blaustein & Judlowe

[57] ABSTRACT

This invention prevents dust, and particularly respirable dust, from becoming airborne at locations where coal or other dusty products are transferred from one support to another, and where spaces between the pieces of broken material open up and would otherwise release dust into the surrounding atmosphere. Foam, having bubbles small enough to be broken by respirable dust particles, is discharged into the spaces where the small bubbles, bursted by the dust particles, implode and wet the particles and cause adherence of the particles to adjacent surfaces, such as other foam or the broken pieces of material that separate to open up the spaces.

13 Claims, 4 Drawing Figures

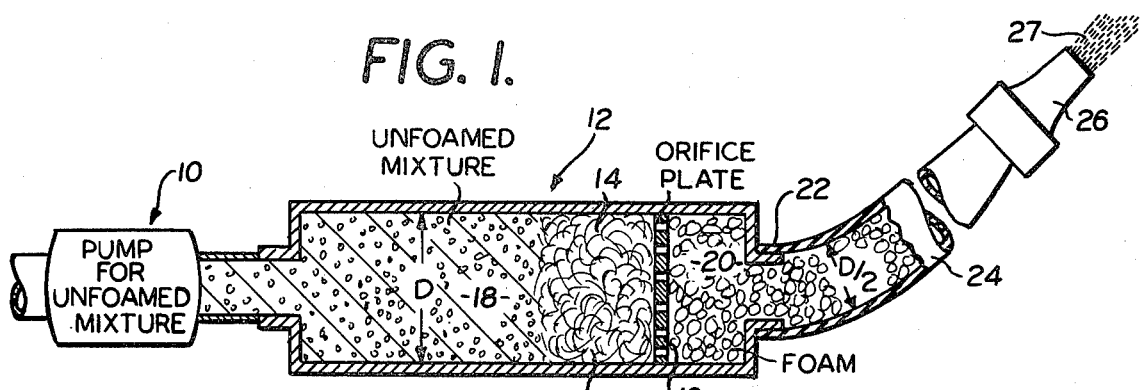
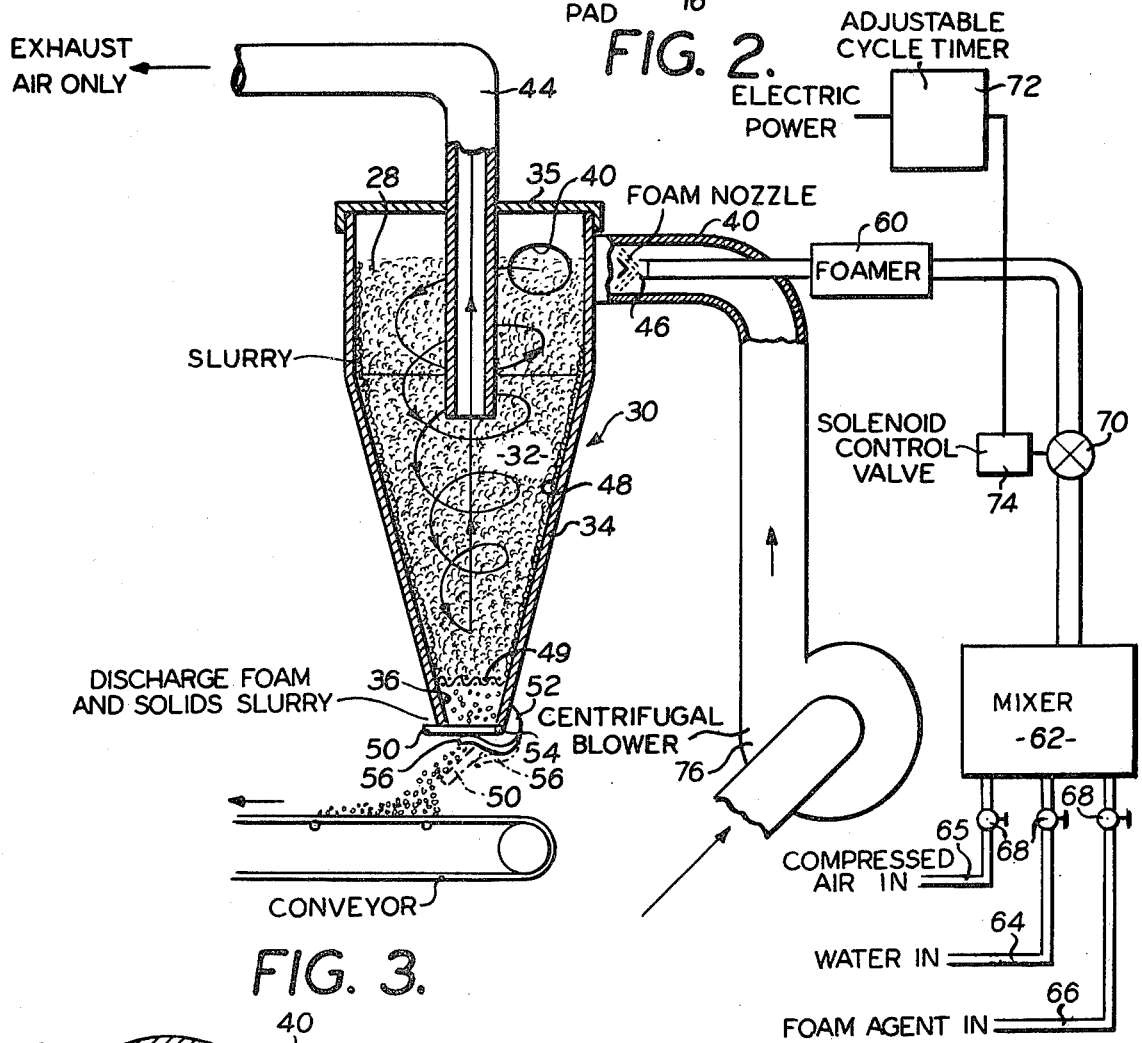
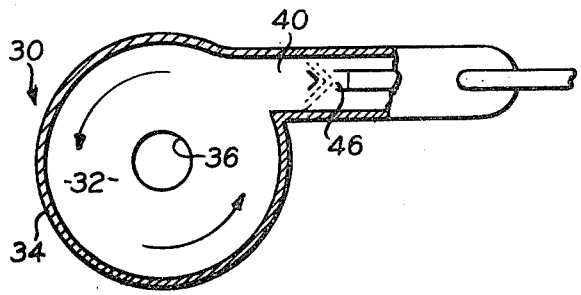
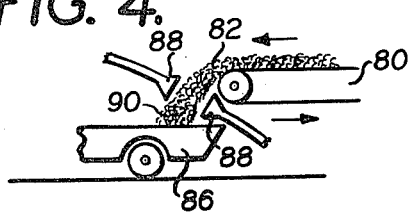

4,400,220

SUPPRESSION OF RESPIRABLE DUST WITH FOAM

RELATED APPLICATIONS AND PATENTS

This is a continuation of application Ser. No. 218,201, filed Dec. 19, 1980, now abandoned, which was a continuation of application Ser. No. 042,634, filed May 25, 1979, now abandoned, which was a continuation of Ser. No. 849,264, filed Nov. 7, 1977, now abandoned, which was a continuation of application Ser. No. 696,733, filed June 16, 1976, now abandoned, which was a division of application Ser. No. 527,812, filed Nov. 27, 1974, now U.S. Pat. No. 4,000,992.

Small bubble foam for use in a cyclone separator is disclosed in my U.S. Pat. No. 3,847,571. Mechanism for supplying foam to the transfer station illustrated in FIG. 4 of this application is shown in my U.S. Pat. No. 3,811,660. A division (Ser. No. 423,576, filed Dec. 10, 1973) of U.S. Pat. No. 3,811,660 was replaced by a continuation application Ser. No. 574,883, filed May 6, 1975, now abandoned. Some claims from this latter application were transferred to the above divisional application Ser. No. 696,733, filed June 16, 1976, now abandoned.

BACKGROUND AND SUMMARY OF THE INVENTION

The term "foam", as used herein, designates a mixture of liquid, gas, and a surfactant that gives the liquid a film strength which permits the formation of long lasting bubbles when the mixture is agitated to convert it into a mass of bubbles. The liquid used is normally water, and the gas is usually air, because these ingredients are of low cost; but other gas and/or liquid can be used when compatible with the surfactant.

Various compounds are used as surfactants, and these can be purchased on the open market. Some of these compounds are proprietary. The strength of the film depends upon the characteristics of the surfactant, and the amount of the surfactant in the liquid-gas mixture, as will be more fully explained.

In order to have small particulate matter efficiently trapped, it is necessary for the particle to contact with a bubble of the foam and burst the bubble. As the bubble bursts, the gas in the bubble escapes; the bubble implodes; and the liquid film of which the bubble was made coats the particle. Small particles do not burst large bubbles and are not wetted or trapped by the foam. The smaller the bubble, the smaller the particles that can be trapped. This invention traps all detectable particles as a result of smaller bubbles made with higher strength foam.

The foam described in this specification has the bubbles burst by contact with small particles of material (dust) and the bursting bubble wets the particle. Particles as small as one micron are readily wetted. As this effect proceeds, the foam is destroyed by contact with the particles. The wetted particles must then be either (1) brought together,
(2) made to contact larger particles, or
(3) brought into contact with a surface, which may be additional foam.

If the foam is injected into a free-falling aggregate (at a transfer point between belts, for example, or injected into a crusher along with the aggregate), the mechanical motion of the aggregate will provide the required particle-to-particle contact. When the foam is injected into an aggregate which is all fines (one to two hundred micron), some means must be provided to cause the wetted particles to coalesce. This is readily accomplished by use of a cyclone, as disclosed in the patent application Ser. No. 527,812, filed Nov. 27, 1974 referred to above, now U.S. Pat. No. 4,000,992, to which this application is related.

Another advantage of small bubble foam is that it can be ejected from nozzles at considerable pressure and resulting high velocity. This will be explained more fully in the description of the preferred embodiment.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic sectional view showing a foam generator for making small bubble foam which is used with this invention;

FIG. 2 is a diagrammatic view showing a cyclone separator equipped with a foam supply and with means for withdrawing particulate matter from the cyclone chamber in a foam slurry;

FIG. 3 is a sectional view taken on the line 3—3 of FIG. 2; and

FIG. 4 is a diagrammatic view of a transfer point for dust-laden material with foam projected into the transferring material.

DESCRIPTION OF PREFERRED EMBODIMENT

The mixture used for this invention is preferably a mixture of air, water and a surfactant that is made for "high expansion foam." Such a foam has a high expansion ratio when the foam is developed by conventional fire equipment; that is, an ultimate volume of foam which is from 100 to 1000 times, or more, of the volume of the water and surfactant from the foam is formed.

While the present invention uses a surfactant of this type in order to obtain great film strength, the expansion ratio is reduced by the fact that the foam is made with small bubbles. Bubble formation in making foam with my equipment is the result of vortex effect in a passage. The boundary layer of the unfoamed mixture drags on the sides of the passage, and the smaller the passage, the more the turbulence and vortex action.

FIG. 1 is a diagrammatic sectional view of apparatus for making the small bubble foam of this invention. The mixture of water, air and surfactant ("foaming agent") is forced by the pump 10 into a foamer 12 which contains a cartridge pad 14.

This pad 14 has a myriad of small interconnecting interstices. It may be a sponge made of polyurethane or other plastic; but the preferred structure is a stainless steel scouring pad sold under the trademark "CHORE BOY" and manufactured by Metal Textile Co., P.O. Box 315, South Bound Brook, N.J. 08880.

One or more of these pads 14 are stuffed into the hollow interior of the container 12 until the full cross-section of the container is evenly filled across one end of the interior of the container, as shown in FIG. 1. A perforated partition 16 in the container is positioned to divide the container into a pad chamber 18 and a foam chamber 20. The small bubble size is obtained by pushing the unfoamed mixture through a myriad of tortuous passages under sufficient pressure to obtain a high velocity that will result in the small foam bubbles.

With a CHORE BOY scouring pad 14 stuffed into the chamber 18 of the container 12, with a diameter "D" of three inches, and with the scouring pad of an axial length of approximately three inches, the foam should be discharged from an outlet 22 at the rate of from five to ten cubic feet per minute in order to have the necessary velocity through the foaming pad 14 to produce the small bubbles required by this invention. This example is given merely by way of illustration. The mixture supplied to the foamer 12 has water equal to from 1 to 4% of the volume of the air and the surfactant is from 1 to 6% of the volume of the water and preferably 2%. The expansion ratio of the foam may be from 25 to 100.

Expansion Ratio = Vol. gas/Vol. liquid.

Suitable surfactants can be purchased from suppliers of fire-fighting foam, and from other sources. A preferred surfactant for this invention is DeTer 1009 Foam Agent sold by the DeTer Company, Inc., of Mountain Lakes, N.J.

Conventional foams can flow by gravity and can be pushed through passages if the pressure is low. High velocity foam has to have considerable pressure behind it, and this is possible with foam having very small bubbles but cannot be used for large bubble foam because the bubbles collapse. Thus small bubble foam can be penetrated into a dusty mass of material such as at material transfer points already described. The equipment shown in FIG. 1 will produce foam having bubbles between 0.0005 and 0.015 inch. This will trap particulate matter as small as 1 micron in diameter and in the size range which includes 1 to 50 microns in diameter, and carry large pieces up to 1 inch in size. The foam can effectively trap such small particles if the average size of the foam bubbles is less than 0.015 inch; but the same amount of foam will trap more particles if all of the bubbles are smaller than 0.015 inch and preferably between 0.0005 and 0.015 inch, as already described.

The outlet 22 of the foamer 12 has a flexible pipe or hose 24 leading to a nozzle 26 from which foam 27 is discharged under substantial velocity for permeation through a mass of dusty material at a transfer point or other location where the material is in motion, and dust would be discharged into the ambient atmosphere if the foam 27 were not used to suppress the dust.

FIG. 2 of the drawing shows a cyclone separator 30 which has a frusto-conical separation chamber 32 with a wall 34 that extends downward to an opening 36.

Gas, laden with particulate matter, flows into the chamber 32 from a passage 40 at the upper end of the chamber 32. This passage 40 is positioned to discharge its gas stream tangentially around the circumference of the upper part of the chamber 32 and in contact with the wall 34.

The passage 40 discharges gas into the separation chamber, which has a cover 35, and the gas flows downwardly with a swirling movement and increasing velocity as the cross-section of the separation chamber decreases. Particulate matter in the gas is thrown outward by centrifugal force, and the gas, separated from its particulate matter, reverses its flow at the center region of the separation chamber and flows upward to an outlet discharge 44 which extends upward through the top of the chamber and in substantial alignment with the axis of the chamber 32. The construction and operation of the cyclone separator, thus far described, is in accordance with conventional practice.

This invention introduces foam into the particulate laden gas stream. In the illustrated embodiment, the foam is injected into the gas stream by a nozzle 46 which extends into the gas inlet passage 40 upstream from the outlet of this passage 40 where the gas flows into the separation chamber 32. The foam traps the particulate matter and forms, with the particulate matter, a slurry.

The coating of slurry, indicated by the reference character 48, on the wall of the separation chamber is indicated in elevation by stippling in the drawing. The slurry 48 runs down the wall and accumulates in the lower part of the separation chamber 32 at the opening 36 which is normally closed by a bottom 50.

In the construction illustrated, the bottom 50 is supported from the wall 34 by a bracket 52 to which the bottom is connected by a hinge comprising a pin 54 which extends through one side of the bottom 50 and through aligned openings in the bracket 52. A spring 56 is connected at one end to the bracket 52, and the other end of the spring 56 contacts with the bottom 50 to hold the bottom in a position to close the opening 36, as indicated in full lines in FIG. 1. When sufficient weight of slurry accumulates in the lower end of the separation chamber 32, the weight of the slurry overcomes the force of the spring 56 and causes the bottom 50 to swing into an open position, as indicated in dotted lines in FIG. 2. The accumulated slurry drops out of the chamber, and the spring 56 pushes the bottom 50 back into closed position.

A foam generator 60 supplies the nozzle 46. Foam generators are well-known, and the block diagram of FIG. 2 is sufficient for a complete understanding of this invention. Water, air and foaming agent are supplied to the foamer 60 from a mixer 62; and the water, air and foaming agent are supplied to the mixer 62 through pipes 64, 65 and 66, respectively.

Each of the pipes 64, 65 and 66 is shown with a valve 68 for regulating the supply of water, air or foaming agent, and the proportions in which these ingredients are supplied to the mixer 62. These valves 68 are merely representative of means for controlling the supply of the ingredients to the mixer 62 and for proportioning the ingredients.

More elaborate controls for the ingredients supplied to the mixers 62 can be used, such as fluid flow regulators that receive fluid at variable pressure and deliver it at a uniform pressure and/or flow. These controls are adjustable to regulate the proportions supplied to a mixer. Such controls are also well-known, and the particular apparatus used for controlling the flow and proportions of the ingredients is a matter of choice.

Experience has shown that it is not essential to supply foam continuously to the separator. It is sufficient that the wall of the separation chamber be at least partially coated with foam at all times. In order to conserve foam, a control valve 70 is located between the mixer and the foamer for shutting off the mixture at times when no foam is required.

In order to program the supply of foam with the operation of the cyclone separator, of a cycle timer 72 controls a power supply to a solenoid or other actuator 74 for the valve 70. The cycle timer 72 opens and closes the valve 70 periodically and for such length of time as necessary to maintain the required amount of foam in the separation chamber.

In accordance with conventional practice, the gas and particulate matter is supplied to the separator by a centrifugal blower 76 or other apparatus for moving the air and solids.

FIG. 4 shows a belt conveyor 80 which transfers coal 82, or other dusty material, to truck 86. As the coal falls into the truck 86, dust would float off into the ambient atmosphere; and the smaller particles are the most objectionable because they are lighter and remain airborne for larger periods of time.

Foam nozzles 88 discharge small bubble foam 90 into the moving mass of coal, and the foam contacts with the dust present in the falling coal. The foam is projected from the plurality of nozzles 88 at different locations around the falling dusty material for obtaining penetration into the falling material from different sides far enough to reach into the center region of the falling material. The dust particles burst the bubbles with which they contact, and implosion of the bursting bubbles traps and coats the dust particles with the liquid of which the bubble was formed.

This traps the wetted particles on the surface of adjacent material. With broken dusty material, the dust is suppressed by projecting the small bubble foam into the broken material while said material is in motion. The rate of foam supply is coordinated with the quantity of particles to maintain a supply of foam during the entire operation for preventing additional particles of dust from becoming airborne, and as the foam is destroyed by contact of the particles with the bubbles of the foam.

Where the transfer of dusty material from one support to another is by free fall to the other support, the small bubble foam is projected into the material to trap the dust thereof while larger particles of the material are separated from one another as a result of the free fall.

The preferred embodiment of this invention has been illustrated and described, but changes and modifications can be made, and some features can be used in different combinations without departing from the invention as defined in the claims.

What is claimed is:

1. Apparatus for preventing dust particles from becoming airborne in coal mines and at other locations where respirable dust particles may escape from broken dusty material in motion, comprising means for supplying foam to the dusty material including in combination a foamer, means for forcing a mixture of air, water, and surfactant through the foamer to form a foam in which bubbles discharged from the foamer are small and of a size 0.015 inch in diameter and smaller, means for moving the material and causing relative motion of the respirable dust and other pieces of the material, means for discharging the foam into contact with the moving material and into any clearance between pieces of the material, so that any respirable dust in the material that might otherwise escape from said broken material and become airborne, while the material is moving, contacts with, bursts and implodes a small bubble and becomes wetted thereby, and the capacity of the means for supplying the foam to the dusty material being correlated with the means for moving the material such that foam is supplied in sufficient quantity to maintain small bubbles of the foam at locations where the respirable dust could otherwise escape from the dusty material and into the atmosphere, whereby the particles of respirable dust contact with the outsides of said small bubbles and are wetted and adhered to adjacent material.

2. The apparatus described in claim 1 characterized by the means for moving the material including a part where the material is in a mass, that the foam cannot penetrate, and further including a support to which the moving material is delivered at a lower level than said part so that the material separates by gravity as the material falls to said lower support, the acceleration of gravity causing separation of pieces and opening up of the clearances between pieces to expose the foam to the dust in the clearances.

3. The apparatus described in claim 2 characterized by the means for moving the material being a conveyor from the end of which the dusty material drops to said support, said support being at a lower level than the conveyor, and said foam-discharging means comprising nozzles in position to discharge foam at locations where the clearances are opened up by the dropping of the dusty material from the conveyor.

4. The apparatus described in claim 3 characterized by the conveyor being at a level higher and clear of the support to provide free fall of the dusty material from the conveyor to the support, said foam nozzles being at different locations around the falling material where the free fall leaves the material and dust at zero gravity during the fall and where respirable dust would float from the falling mass into the surrounding atmosphere, the foam being discharged into the falling mass so as to fully penetrate the clearances in the mass and prevent the respirable dust from becoming airborne.

5. The apparatus described in claim 3 characterized by said foamer and nozzles being of such capacity as to supply sufficient total foam to the broken dusty material to leave some foam on the mass of material when said material reaches the support.

6. The method of preventing respirable dust from becoming airborne, which method comprises:
   (a) forcing a mixture of air, water and surfactant through a foamer having tortuous passages and under pressure and at a velocity to form a foam in which bubbles discharged from the foamer are small and of a size of 0.015 inch in diameter and smaller;
   (b) bringing the foam promptly, while most of the small bubbles persist as such, into contact with dusty material containing respirable size dust particles in the size range which includes 1 to 50 microns;
   (c) causing relative movement of the foam and dusty material and by such relative movement causing the respirable dust particles and small bubbles to contact one another at a location at which the small bubbles persist;
   (d) wetting the respirable dust particles at said location by bursting of the small bubbles with which said respirable dust particles come in contact; and
   (e) supplying enough of said small bubble foam to wet substantially all, or any selected portion of, the respirable dust.

7. The method described in claim 6 characterized by causing the particles to contact with a foam having bubbles between 0.0005 and 0.015 inch in diameter at the time of the contact with the particles, and coordinating the rate of foam supply with the quantity of particles to maintain a supply of foam during the entire operation for preventing additional particles of dust from becoming airborne, and as foam is destroyed by contact of the particles with the bubbles of the foam.

8. The method described in claim 6 characterized by causing the particles to contact with a foam having bubbles of a diameter between 0.0005 and 0.015 inch at the time of contact with the particles.

9. The method described in claim 6 characterized by transferring broken dusty material from one support to another, and suppressing the dust by projecting the small bubble foam into the broken material while said material is in motion and agitated by the transfer.

10. The method described in claim 9 characterized by the transfer including the discharge of the dusty material from one support by free fall to the other support, and projecting the small bubble foam into the material to trap the dust thereof while larger particles of the material are separated from one another as a result of the free fall.

11. The method described in claim 9 characterized by projecting the foam from a plurality of nozzles at different locations around the falling dusty material for obtaining penetration into the falling material from different sides far enough to reach into the center region of the falling material.

12. The method of substantially eliminating respirable dust having particles as small as one micron in an open zone of dust-generation within an active coal-handling or the like operation, which method comprises mixing air, water and surfactant with such turbulence and flow in a confining region prior to discharge into said zone as to project the mixture as a foam into the open zone, the foam having bubbles of less than 0.015 inch diameter within said zone to permeate the zone so that said bubbles burst on contact with and wet at least the respirable-dust components of such dust generation.

13. The method of substantially eliminating respirable dust having particles as small as one micron in a zone of dust-generation within an active coal-handling or the like operation, which method comprises mixing flows of air, water and surfactant with such elevated turbulence in a confining region as to discharge the mixture as small-bubble foam, the water flow being in the range of 1 to 4 percent of the air flow, and the surfactant flow being in the range of 1 to 6 percent of the water flow, whereby by reason of said turbulence and mixture, the discharge is characterized by bubbles of less than 0.015 inch diameter within said zone to permeate the zone and for said bubbles to burst on contact with and wet at least the respirable-dust components of such dust generation.

* * * * *

UNITED STATES PATENT AND TRADEMARK OFFICE
CERTIFICATE OF CORRECTION

PATENT NO. : 4,400,220
DATED : August 23, 1983
INVENTOR(S) : H.W. Cole, Jr.

It is certified that error appears in the above-identified patent and that said Letters Patent is hereby corrected as shown below:

ON TITLE PAGE:
[*] NOTICE - READS AS FOLLOWS IN ERROR:

> The portion of the term of this patent subsequent to January 4, 1994, has been disclaimed.

[*] NOTICE - SHOULD READ:

> The portion of the term of this patent subsequent to November 12, 1991, has been disclaimed.

Signed and Sealed this

Twelfth Day of May, 1992

Attest:

DOUGLAS B. COMER

Attesting Officer

Acting Commissioner of Patents and Trademarks